(12) United States Patent
Chen et al.

(10) Patent No.: US 9,838,232 B2
(45) Date of Patent: Dec. 5, 2017

(54) WIRELESS DEVICE, METHOD, AND COMPUTER READABLE MEDIA FOR SIGNALING A SHORT TRAINING FIELD IN A HIGH-EFFICIENCY WIRELESS LOCAL AREA NETWORK

(71) Applicant: Intel IP Corporation, Santa Clara, CA (US)

(72) Inventors: Xiaogang Chen, Beijing (CN); Qinghua Li, San Ramon, CA (US); Rongzhen Yang, Shanghai (CN); Yuan Zhu, Beijing (CN); Hujun Yin, Saratoga, CA (US)

(73) Assignee: Intel IP Corporation, Santa Clara, CA (US)

( * ) Notice: Subject to any disclaimer, the term of this patent is extended or adjusted under 35 U.S.C. 154(b) by 114 days.

(21) Appl. No.: 14/751,551

(22) Filed: Jun. 26, 2015

(65) Prior Publication Data

US 2016/0128005 A1 May 5, 2016

Related U.S. Application Data (60) Provisional application No. 62/072,272, filed on Oct. 29, 2014.

(51) Int. Cl.
*H04W 52/52* (2009.01)
*H04L 27/26* (2006.01)
(Continued)

(52) U.S. Cl.
CPC ........ *H04L 27/2613* (2013.01); *H04L 5/0048* (2013.01); *H04W 52/325* (2013.01);
(Continued)

(58) Field of Classification Search
CPC . H04J 3/16; H04J 3/17; H04W 28/10; H04W 28/12; H04W 28/14; H04W 28/16;
(Continued)

(56) References Cited

U.S. PATENT DOCUMENTS 9,398,571 B2 * 7/2016 Kwon ............... H04W 72/0406
2015/0023335 A1 * 1/2015 Vermani ............. H04B 7/0452
370/338

(Continued)

FOREIGN PATENT DOCUMENTS

KR WO 2016028125 A2 * 2/2016 ............... H04L 5/00

OTHER PUBLICATIONS

"International Application Serial No. PCT/US2015/050701, International Preliminary Report on Patentability dated May 11, 2017", 7 pgs.

*Primary Examiner* — Robert Lopata
(74) *Attorney, Agent, or Firm* — Schwegman Lundberg & Woessner, P.A.

(57) ABSTRACT

Apparatuses, methods, and computer readable media for signaling high efficiency short training field are disclosed. A high-efficiency wireless local-area network (HEW) station is disclosed. The HEW station may comprise circuitry configured to: receive a trigger frame comprising an allocation of a resource block for the HEW station, and transmit a high efficiency short training field (HE-STF) with a same bandwidth as a subsequent data portion, wherein the transmit is to be in accordance with orthogonal frequency division multiple access (OFDMA) and wherein the transmit is within the resource block. A subcarrier allocation for the HE-STF may matche a subcarrier allocation for the subsequent data portion. The HE-STF and the subsequent data portion may be transmitted with a same power. A total power of active subcarriers of the HE-STF may be equal to or
(Continued)

proportional to a second total of data subcarriers and pilot subcarriers of the subsequent data portion.

24 Claims, 7 Drawing Sheets

(51) Int. Cl.
 *H04W 52/32* (2009.01)
 *H04L 5/00* (2006.01)
 *H04W 72/12* (2009.01)
 *H04W 52/34* (2009.01)

(52) U.S. Cl.
 CPC ........... *H04L 5/0007* (2013.01); *H04W 52/34* (2013.01); *H04W 72/1289* (2013.01)

(58) Field of Classification Search
 CPC ..... H04W 28/18; H04W 28/20; H04W 28/22; H04W 28/24; H04W 28/26; H04W 52/325; H04W 52/34; H04W 72/1289; H04L 27/2613; H04L 5/0007; H04L 5/0048
 USPC ......................................................... 370/468
 See application file for complete search history.

(56) References Cited

U.S. PATENT DOCUMENTS

| | | | | |
|---|---|---|---|---|
| 2015/0124750 | A1* | 5/2015 | Vermani | H04L 27/2636 370/329 |
| 2016/0087766 | A1* | 3/2016 | Sun | H04L 5/0007 370/329 |
| 2016/0105304 | A1* | 4/2016 | Kwon | H04L 27/2665 370/338 |
| 2016/0105836 | A1* | 4/2016 | Seok | H04W 36/32 370/331 |
| 2016/0113009 | A1* | 4/2016 | Seok | H04B 7/0452 370/329 |
| 2016/0113034 | A1* | 4/2016 | Seok | H04W 74/04 370/329 |
| 2016/0119047 | A1* | 4/2016 | Lee | H04B 7/0617 370/329 |
| 2016/0119452 | A1* | 4/2016 | Lee | H04L 69/10 370/338 |
| 2016/0119933 | A1* | 4/2016 | Merlin | H04L 5/0048 370/312 |
| 2016/0295587 | A1* | 10/2016 | Kwon | H04W 72/0446 |
| 2016/0374085 | A1* | 12/2016 | Chun | H04W 52/146 |

* cited by examiner

WIRELESS DEVICE, METHOD, AND COMPUTER READABLE MEDIA FOR SIGNALING A SHORT TRAINING FIELD IN A HIGH-EFFICIENCY WIRELESS LOCAL AREA NETWORK

PRIORITY CLAIM

This application claims the benefit of priority under 35 USC 119(e) to U.S. Provisional Patent Application Ser. No. 62/072,272, filed Oct. 29, 2014, which is incorporated herein by reference in its entirety.

TECHNICAL FIELD

Embodiments pertain to wireless communications in a wireless local-area network (WLAN) such as Institute of Electrical and Electronic Engineers (IEEE) 802.11. Some embodiments relate to signaling a high efficiency WLAN short training field (HE-STF). Some embodiments relate to using the HE-STF to determine an automatic gain control (AGC) for receiving subsequent data using orthogonal frequency division multiple-access (OFDMA).

BACKGROUND

Efficient use of the resources of a WLAN is important to provide bandwidth and acceptable response times to the users of the WLAN. However, often there are many devices trying to share the same resources and the devices may interfere with one another. Moreover, wireless devices may need to operate with both newer protocols and with legacy device protocols.

Thus there are general needs for systems and methods for signaling high efficiency signal fields that may be used to determine an AGC for receiving subsequent data.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
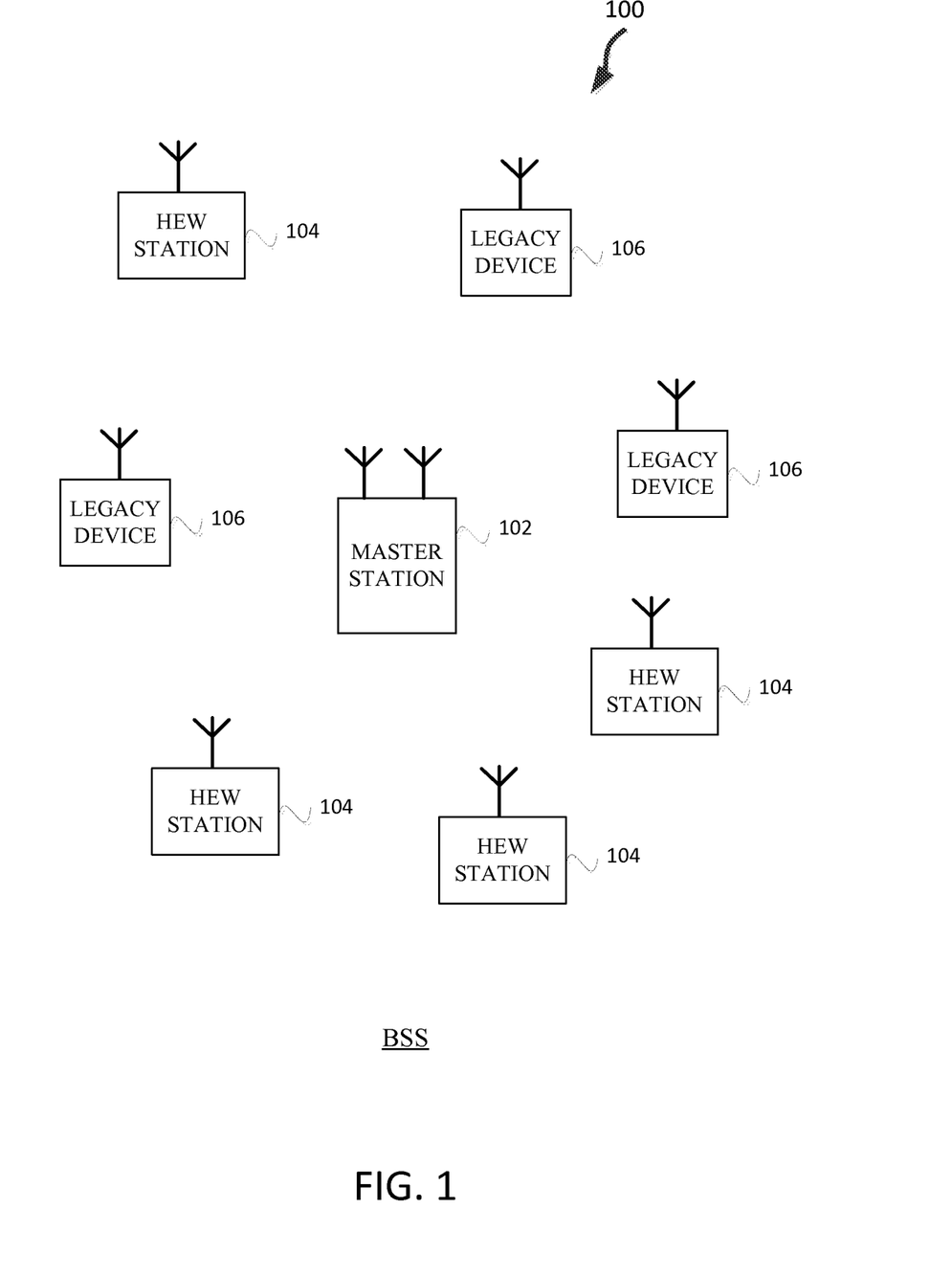
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.1 lax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using OFDMA, time division multiple access (TDMA), and/or code division multiple access (CDMA). The IEEE 802.11 protocol may include a multiple access technique. For example, the IEEE 802.11 protocol may include space-division multiple access (SDMA) and/or MU-MIMO.

The legacy devices 106 may operate in accordance with one or more of IEEE 802.11 a/g/ag/n/ac, IEEE 802.11-2012, or another legacy wireless communication standard. The legacy devices 106 may be STAs or IEEE STAs.

The HEW STAs 104 may be wireless transmit and receive devices such as cellular telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The BSS 100 may operate on a primary channel and one or more secondary channels or sub-channels. The BSS 100 may include one or more master stations 102. In accordance with some embodiments, the master station 102 may communicate with one or more of the HEW devices 104 on one or more of the secondary channels or sub-channels or the primary channel. In accordance with some embodiments, the master station 102 communicates with the legacy devices 106 on the primary channel. In accordance with some embodiments, the master station 102 may be configured to communicate concurrently with one or more of the HEW STAs 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques. Legacy IEEE 802.11 communication techniques may refer to any IEEE 802.11 communication technique prior to IEEE 802.11 ax.

In some embodiments, a HEW frame may be configurable to have the same bandwidth as a sub-channel, and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.0 MHz, 2.5 MHz, 5 MHz and 10 MHz, or a combination thereof or another bandwidth that is less or equal to the available bandwidth, may also be used. A HEW frame may be configured for transmitting a number of spatial streams, which may be in accordance with MU-MIMO.

In other embodiments, the master station 102, HEW STA 104, and/or legacy device 106 may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11 ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating. In accordance with some embodiments, during the master-sync transmission the HEW STAs 104 may contend for the wireless medium with the legacy devices 106 being excluded from contending for the wireless medium during the master-sync transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the master station 102 and/or HEW stations 104 are configured to perform one or more of the functions and/or methods described herein in conjunction with FIGS. 1-7 such as transmitting and receiving HE-SIGs and using the received HE-SIG to determine an AGC for receiving a subsequent data field.

Figure 2:
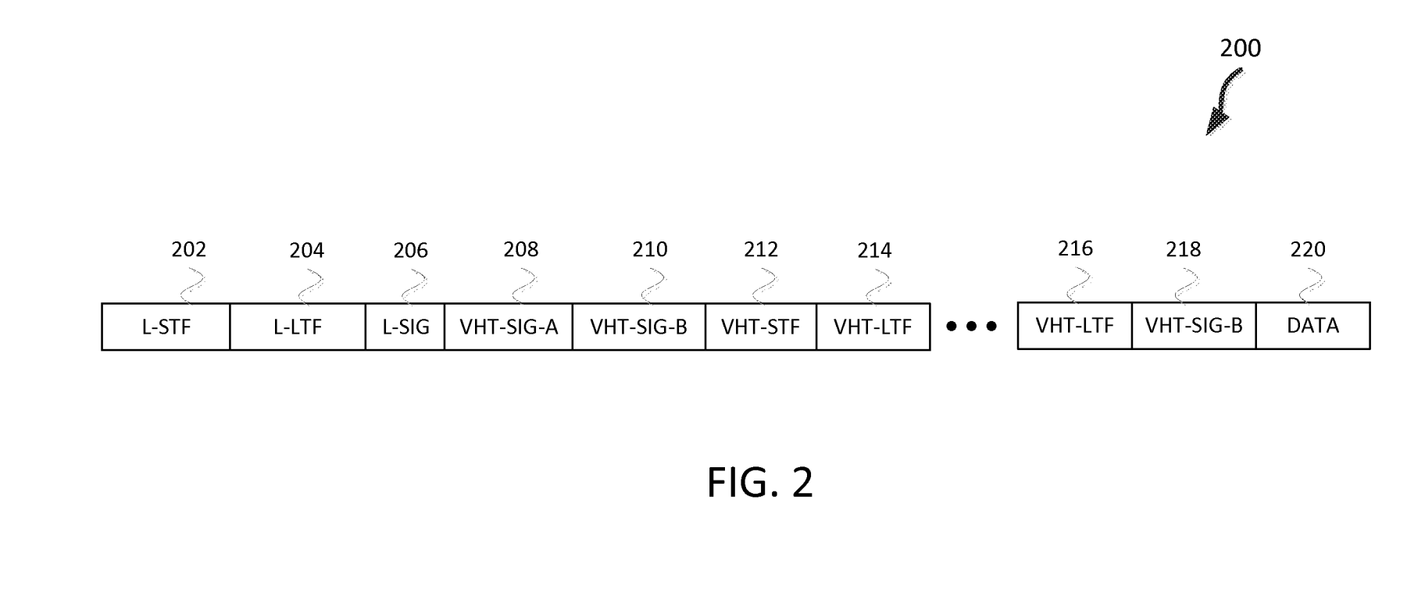
FIG. 2 illustrates a preamble structure in accordance with some embodiments.

FIG. 2 illustrates a preamble structure 200 in accordance with some embodiments. Illustrated in FIG. 2 are a legacy short training field (L-STF) 202, a legacy long training field (L-LTF) 204, a legacy signal field (L-SIG) 206, a very-high throughput signal A field (VHT-SIG-A) 208, a VHT-SIG-B 210, a very-high throughput short training field (VHT-STF) 212, a very-high throughput long training field (VHT-LTF) 214, a second VHT-LTF 216, a second VHT-SIG-B 218, and a data field 220.

The L-STF 202 and the L-LTF 204 may be 12 orthogonal frequency division multiplexing (OFDM) symbols that may include information for synchronizing timers, selecting antennas, or other information. The L-SIG field 206 may be used to describe the data rate and length of the frame. The VHT-SIG-A 208 field and VHT-SIG-B 210 field may be only used by master stations 102, HEW stations 104, and legacy devices 106 that are configured to operate in accordance with IEEE 802.11 ac.

The VHT-STF 212 may be a field to help the master station 102, HEW station 104, and/or legacy device 106 tune in the signal. The VHT-LTF 214 may be a field that comprises a sequence of symbols that set up demodulation of the rest of the frame. The second VHT-LTF 216 may be a duplicate of the VHT-LTF 214 or include additional information. The VHT-SIG-B 218 may be a duplicate of the VHT-SIG-B 210 or may contain additional information. The data field 222 may comprise higher layer packets which may include an aggregate frame comprising multiple higher-layer packets.

The master stations 102, HEW stations 104, and legacy devices 106 may be configured with AGC for OFDMA. The AGC may use the energy estimated from a short training field such as L-STF 202 or VHT-STF 212 to adjust the signal path gain and make the AGC loop converged in order to lower the analog to digital clipping and quantization noise.

Figure 3:
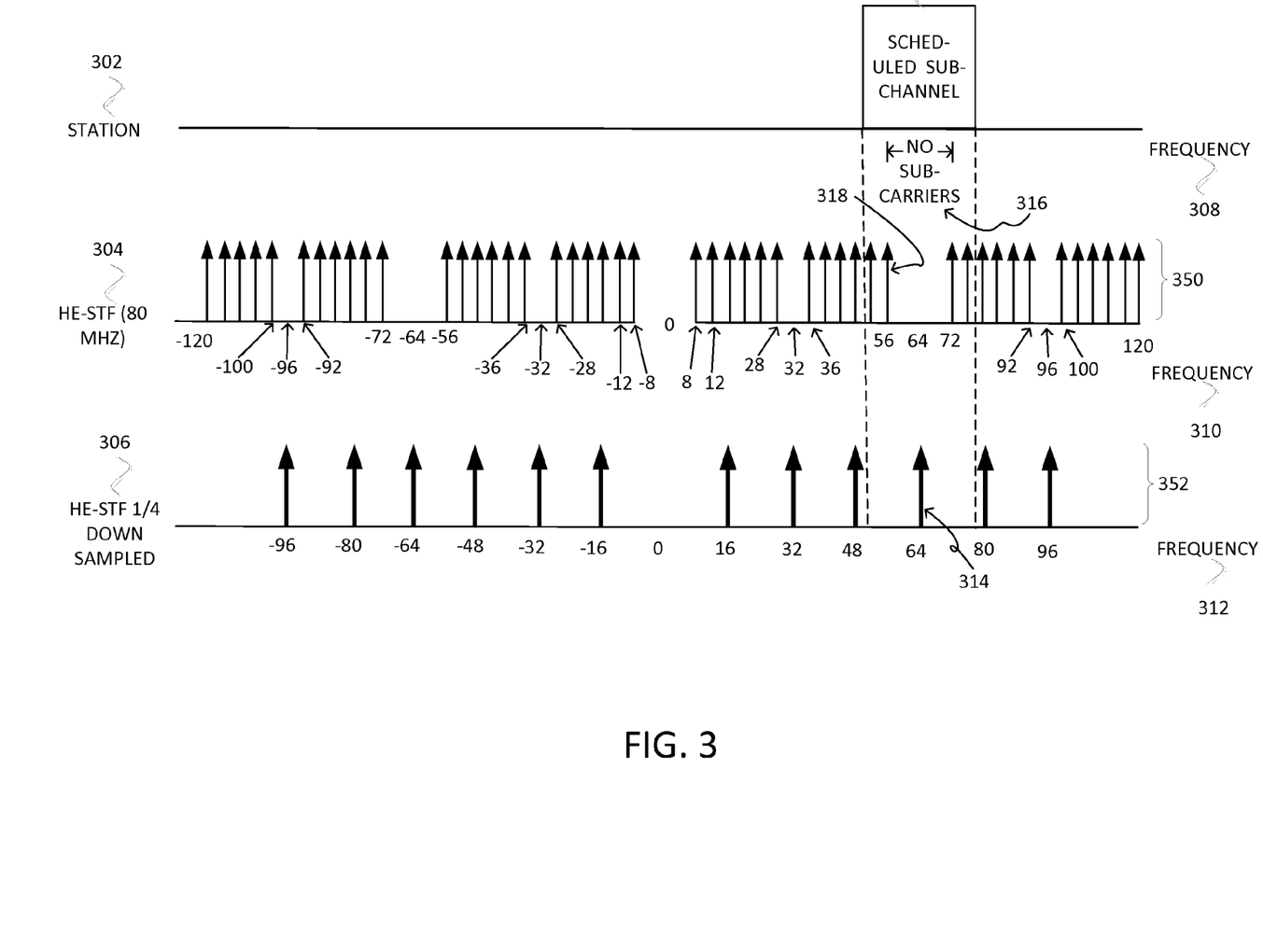
FIG. 3 illustrates a HE-STF in accordance with some embodiments.

FIG. 3 illustrates a HE-STF 304 in accordance with some embodiments. Illustrated in FIG. 3 are a station 302, a HE-STF 304, and a HE-STF ¼ down sampled 306. The frequency 308, 310, 312 is illustrated along a horizontal axis for the station 302, the HE-STF 304, and the HE-STF ¼ down sampled 306, respectively. The station 302 may be a master station 102 or a HEW station 104. The scheduled subchannel 320 indicates a subchannel that is scheduled for the station 302 for a downlink transmission. The scheduled subchannel 320 may have been indicated in a trigger frame received by the scheduled station 302. The scheduled subchannel 320 may be a portion of an 80 MHz bandwidth. For example, the subchannel 320 may be 2.5 MHz or another bandwidth less than or equal to 80 MHz.

The HEW STF 304 may be for a bandwidth of 80 MHz. The HE-STF 304 is a subcarrier allocation. The HE-STF 304 may be used for IEEE 802.11ac. In some embodiments the HE-STF 304 is a subcarrier allocation that may be used in IEEE 802.11ax. The symbol duration in IEEE 802.11ax may be four times longer than in IEEE 802.11ac. The arrows indicate subcarriers 350. Subcarriers 318 are within the scheduled subchannel 320. In some embodiments subcarriers may be termed tones. In some embodiments arrows that are not ghosted may be active subcarriers and arrows that are ghosted are part of a subcarrier pattern but are not active. For example, subcarrier 515 (FIG. 5) is ghosted so it may be part of a subcarrier pattern, but may not be active.

In some embodiments beam forming may be used to send the scheduled subchannel 320 portion of the HE-STF 304 to the station 302. If beamforming is used in the downlink, then the station 302 may receive littler power from other portions of the HE-STF 304 except the subchannel 320 portion. The station 302 may only receive the subcarriers 318 that are included in the scheduled subchannel 320 portion of the scheduled subchannel 320.

The station 302 may not be able to predict the total received power of the data portion (e.g., 220 of FIG. 2) because the subcarriers 318 of the HE-STF 304 are not dense enough in the subchannel 320 for an accurate estimation of the power. For example, as illustrated, there are only four subcarriers 318 in the subchannel 320. The HE-STF 304 may include a portion of the scheduled subchannel 320 where there are no subcarriers 316.

For each resource allocation such as the subchannel 320 the total power of both the data subcarriers (e.g., the subcarriers of data 220 of FIG. 2) and the pilot subcarriers should be equal to or proportionally represented by the total power of the corresponding HE-STF 304 tones for the station 320 to improve the AGC.

The HE-STF ¼ down sampled 306 may be subcarriers 314 that are a sampling density in frequency of every 16 subcarriers of the HE-STF 304. In some embodiments other sampling densities may be used. The subcarriers 314 may have a 4× symbol duration in comparison with IEEE 802.11ac. The subcarriers 314 of the HE-STF ¼ down sampled 306 may mean that only one subcarrier 314 may be within the scheduled subchannel 320. Having only one subcarrier 314 in the scheduled subchannel 320 may cause the AGC measurement for the station 302 to have an energy mismatch between the portion of the HE-STF 304 within the scheduled subchannel 320 and the data (e.g. data 220 of FIG. 2). The HE-STF ¼ down sampled 306 may increase repetition in time and compensate for DC offset.

Figure 4:
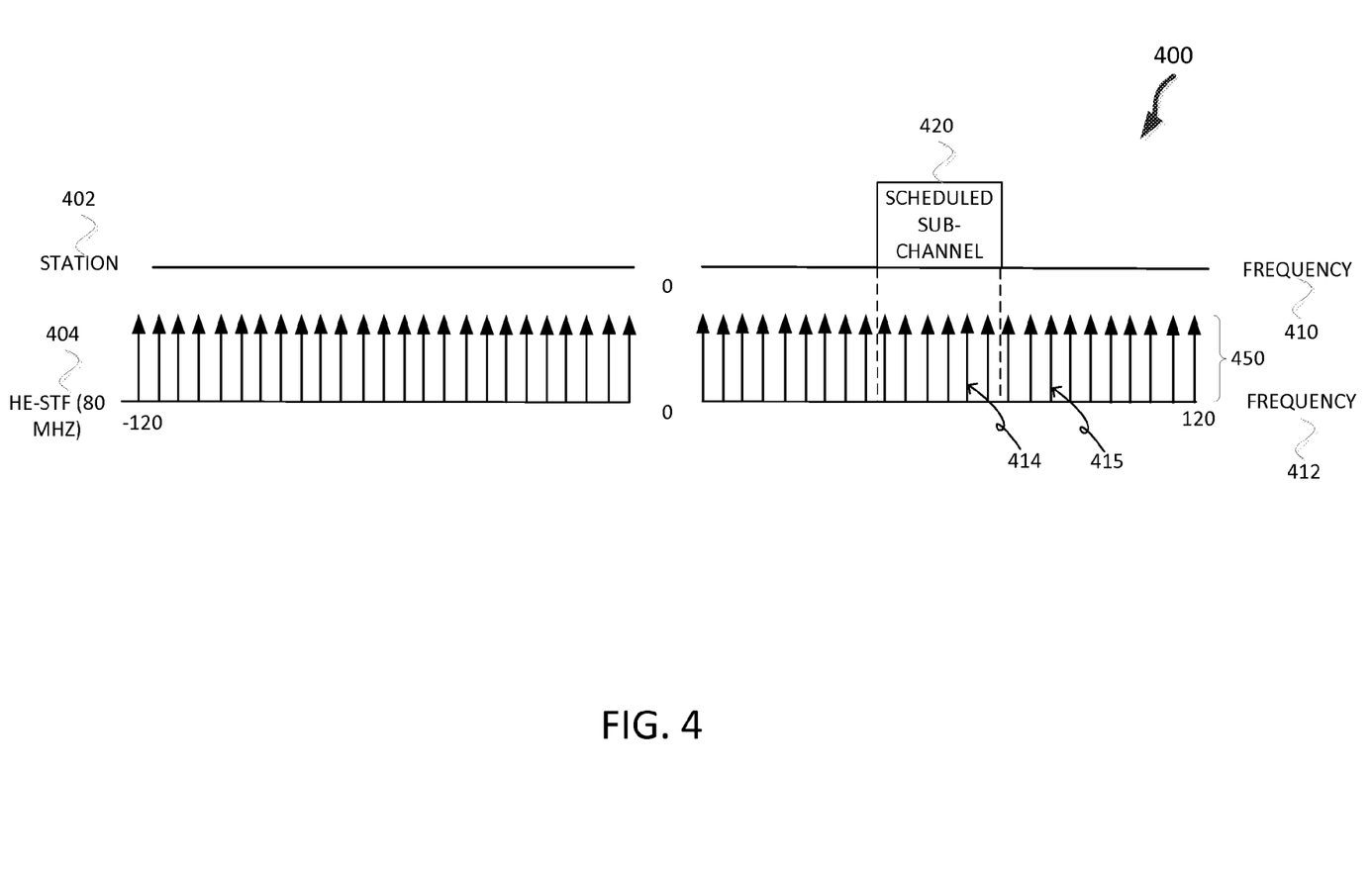
FIG. 4 illustrates a HE-STF subcarrier allocation in accordance with some embodiments.

FIG. 4 illustrates a HE-STF 404 subcarrier allocation in accordance with some embodiments. Illustrated in FIG. 4 are a station 402, and a HE-STF 404. The frequency 410, 412 is illustrated along a horizontal axis for the station 402 and HE-STF 404, respectively. The arrows indicate subcarriers 450. The station 402 may be a master station 102 or a HEW station 104. The scheduled subchannel 420 indicates a subchannel that is scheduled for the station 402 for a downlink transmission. The scheduled subchannel 420 may have been indicated in a trigger frame received by the scheduled station 402. The scheduled subchannel 420 may be a portion of an 80 MHz bandwidth. For example, the subchannel 420 may be 2.5 MHz or another bandwidth less than the 80 MHz. The scheduled subchannel 420 may be a subchannel that is contended for in a trigger frame random channel access period.

The subcarriers 450 that are active in an allocated subchannel such as scheduled subchannel 420 may be termed the active STF subcarriers. For example tone 414 within scheduled subchannel 420 may be termed an active STF subcarrier. In some embodiments the subcarriers 450 such as subcarriers 414, 415 may be distributed so that each allocation block, unit, sub-band, and/or sub-channel with the same bandwidth has a similar number of subcarriers 414, 415. The subcarriers 414, 415 may be evenly distributed across the usable subcarriers except the DC and edge subcarriers. The subcarriers 414, 415 being evenly distributed across the usable subcarriers may enable the station 402 to improve AGC measurement. The subcarriers 414, 415 being nearly evenly distributed across the usable tones may enable the station 402 to improve AGC measurement.

In some embodiments the HE-STF 404 may have the same bandwidth as an allocated bandwidth in which data is transmitted. In some embodiments the station 402 may transmit a HE-STF (not illustrated) in the uplink with a same bandwidth as an allocated or scheduled subchannel. For example, station 402 may transmit a HE-STF with a bandwidth that is the same as the bandwidth of the scheduled subchannel 420.

In some embodiments a master station 102 may transmit the HE-STF 404 to the station 402 using beam forming and the station 402 may only receive the scheduled subchannel 420 portion without significant attenuation. The master station 102 may then transmit a subsequent data portion on the same scheduled subchannel 420. The master station 102 may use a same subcarrier pattern for the HE-STF 404 within the scheduled subchannel 420 as for a subsequent data portion within the subchannel 420. The master station 102 may transmit the HE-STF 404 using a bandwidth that is greater than the bandwidth of the scheduled subchannel 420 and which may be the same bandwidth as a subsequent data portion which may be to more than one station 402 and which uses OFDMA.

In the uplink, the station 402 may transmit the subcarrier 414 only as a HE-STF 404 to the master station 102. The station 402 may then transmit a subsequent data portion using OFDMA to the master station 102 using subcarriers 414 within the scheduled subchannel. In some embodiments a same subcarrier pattern is used for the HE-STF 404 as for the subsequent data portion.

The signal power of the active subcarriers (e.g., 450, 414, 415) of the HE-STF 404 within the scheduled subchannel 420 may match or be proportional to the total power within the scheduled subchannel 420 for the subsequent data portion. The master station 102 and/or the HEW station 104 may use the subcarriers 414 to determine the AGC setting for receiving the subsequent data portion.

Using the same subcarrier pattern for both the HE-STF 404 and the subsequent data portion in either an uplink transmission or a downlink transmission may have the technical effect of the receiver experiencing the same channel attenuation which may improve the AGC setting.

Figure 5:
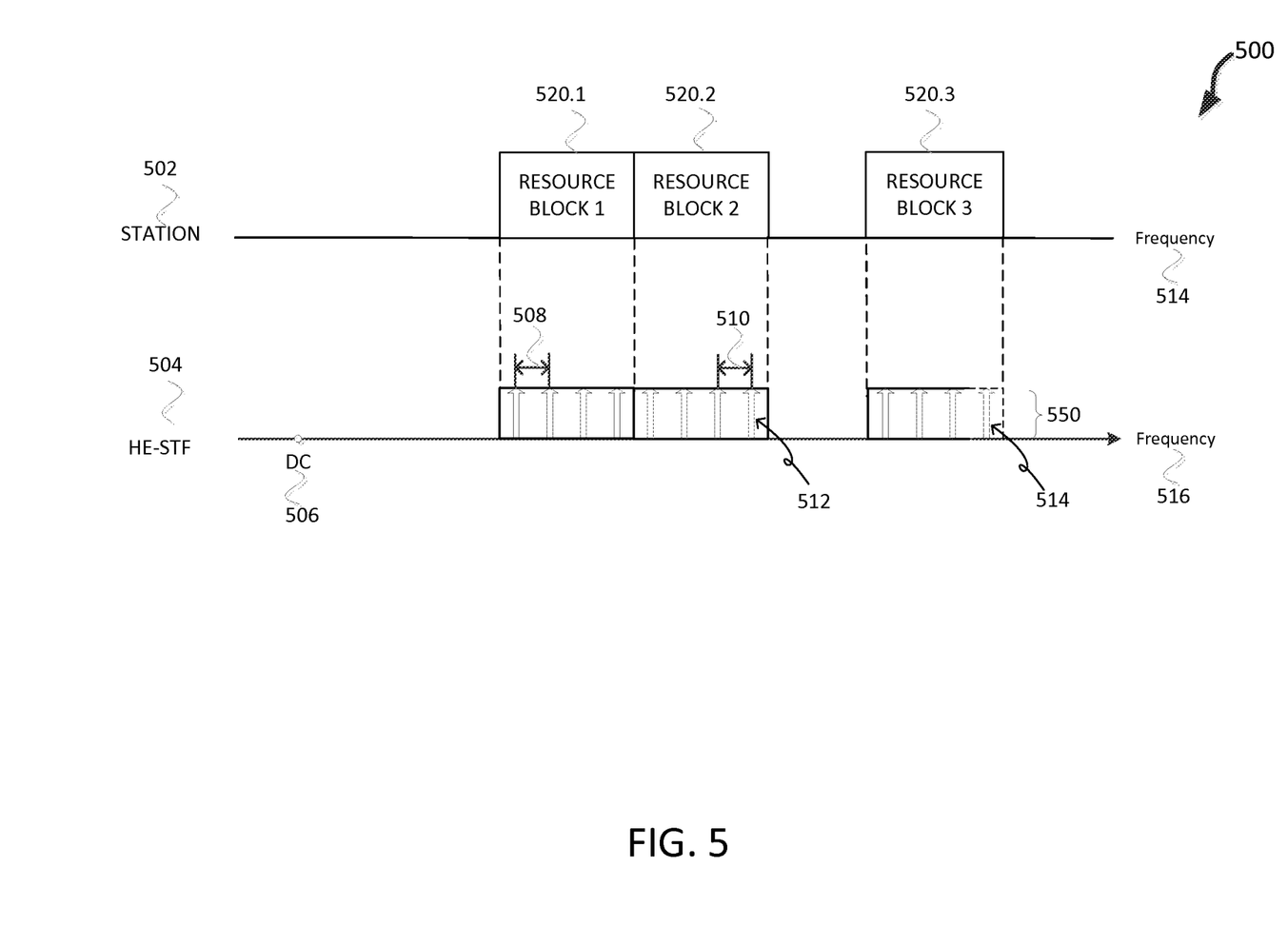
FIG. 5 illustrates a HE-STF active subcarrier allocation in accordance with some embodiments.

FIG. 5 illustrates a HE-STF 504 active subcarrier allocation in accordance with some embodiments. Illustrated in FIG. 5 are station 502, HE-STF 504, resource block 1 520.1, resource block 2 520.2, and resource block 3 520.3. The frequency 514, 516 is along a horizontal axis for the station 502 and the HE-STF 504, respectively. The station 502 may be a master station 102 or HEW station 104. Subcarriers 550 such as subcarrier 512 may be subcarriers that are active. The ghosted arrow at 514 may be an inactive or muted subcarrier 514.

The resource blocks 520 may be resource blocks allocated to the station 102 for uplink or downlink transmission. In some embodiments the resource blocks 520 may be allocated to more than one station 502.

The station 502 may be allocated the resource blocks 520 in a trigger frame for uplink or downlink transmission to a master station 102. In some embodiments the resource blocks 520 may be one or more subchannels the station 102 is transmitting on in the uplink. For example, the station 502 may have received a trigger frame for random access and determined to transmit within the resource blocks 520. In some embodiments the resource blocks 520 may be contiguous.

Each of the resource blocks 520 may have the same number of subcarriers such as 26, 56, 30, or 32, or there may be a fixed number of subcarriers for different sized resource blocks 520. The station 502 may transmit the HE-STF 104 in a same patter for each of the resource blocks 520. For example as illustrated the station 502 transmits four subcarriers 550 such as subcarrier 512 for resource block 2 520.2. The station 502 may alter the pattern to leave a subcarrier inactive or mute a subcarrier 550 at an edge of the bandwidth or at the DC 506. For example, muted subcarrier 514.

In some embodiments the tones 550 or active subcarriers are transmitted on even subcarriers so that the HE-STF 504 may be repeated in the time domain which may assist the receiver in estimating the DC offset. The spacing 508, 510 between the tones 550 may be the same.

In some embodiments the HE-STF 504 tone allocation will match the tone allocation in the OFDMA allocation. In some embodiments every resource block 220 has at last two tones. In some embodiments the HEW device 104 is configured to transmit a separate HE-STF 504 in each resource block 520.

Figure 6:
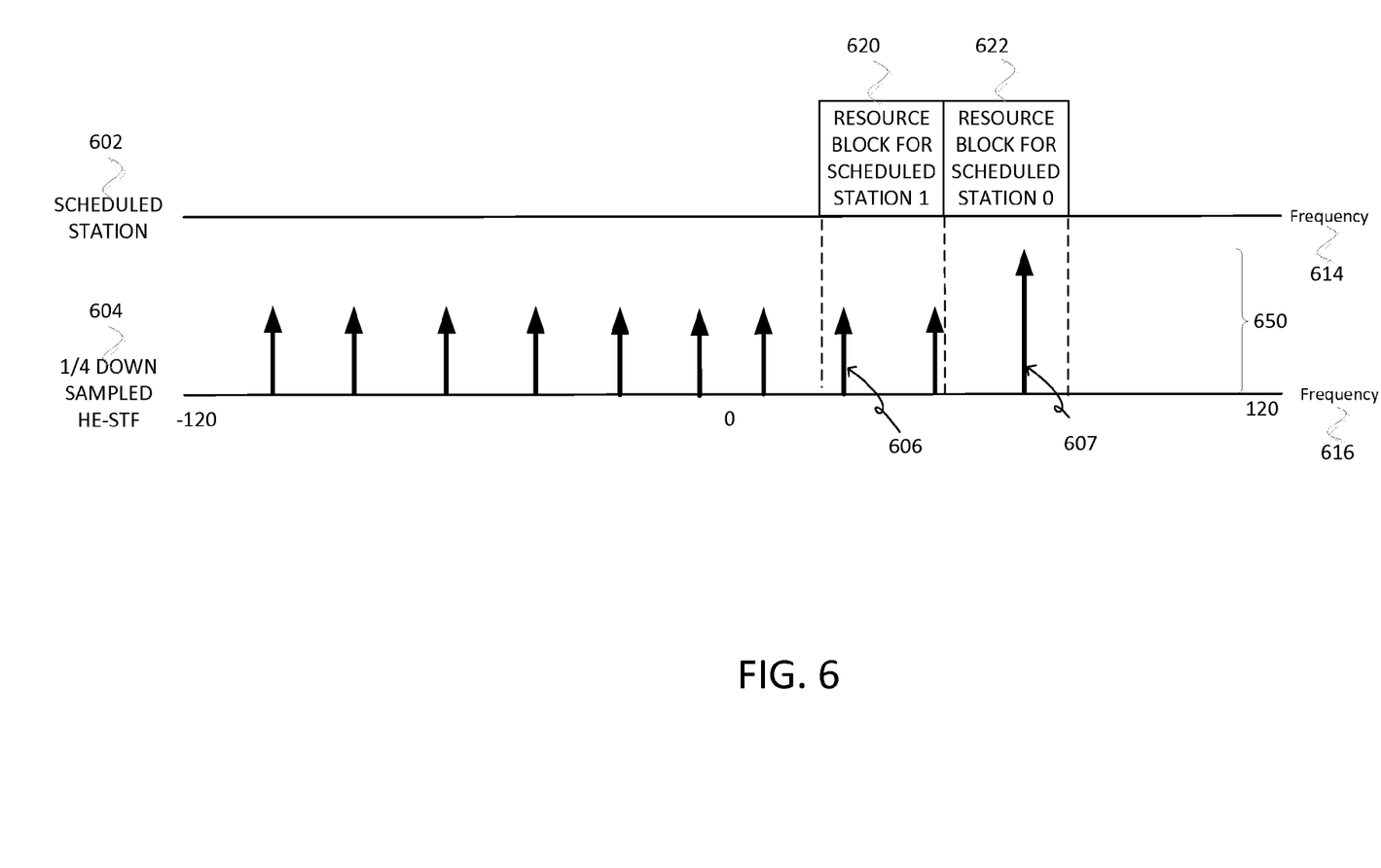
FIG. 6 illustrates a ¼ down sampled HE-STF active subcarrier allocation in accordance with some embodiments.

FIG. 6 illustrates a ¼ down sampled HE-STF 604 active subcarrier allocation in accordance with some embodiments. Illustrated in FIG. 6 are scheduled station 602 and ¼ down sampled HE-STF 604. The frequency 614, 616 is along a horizontal axis for the scheduled station 602 and ¼ down sampled HE-STF 604, respectively.

The scheduled station 602 may include a resource block for scheduled station 1 620 and a resource block for scheduled station 0 622. Subcarriers 650 such as subcarrier 606 and subcarrier 607 are active subcarriers and are indicated with up arrows. The scheduled station 602, which as illustrated are station 1 and station 0, may be a master station 102 or HEW station. Resource block for station 1 620 may be a resource block of an allocation for station 1. Resource block for station 0 622 may be a resource block for an allocation for station 0. The ¼ down sampled HE-STF 602 may be a down sampling of the HE-STF transmission of the scheduled station 602 or may be the received signals of the scheduled station 602 which was transmitted by a master station 102 or HEW station 104.

Down sampling may change the ratio between the number of subcarriers 650 in a HE-STF and the corresponding data portion of the subcarriers 650. Resource block for scheduled station 0 622 has only one subcarrier 607 and may have 32 data portion subcarriers while the resource block for scheduled station 1 620 of the same size as resource block for scheduled station 0 622 has two active tones 606. In some embodiments the scheduled station 602 are configured to adjust the power used for the subcarrier 607 for the HE-STF when the number of active subcarriers 607 varies. For example, station 0 may transmit active subcarrier 607 with twice the power as station 0 transmits active subcarriers 606. The power compensation may be used both in the uplink by station 0 and in a downlink transmission by a master station 102 where the subcarrier 607 indicates a subcarrier received by station 0.

For uplink transmissions or for downlink transmissions the scheduled station 102 may have a small allocated resource block such as subchannel of 2.5 MHz.

Figure 7:
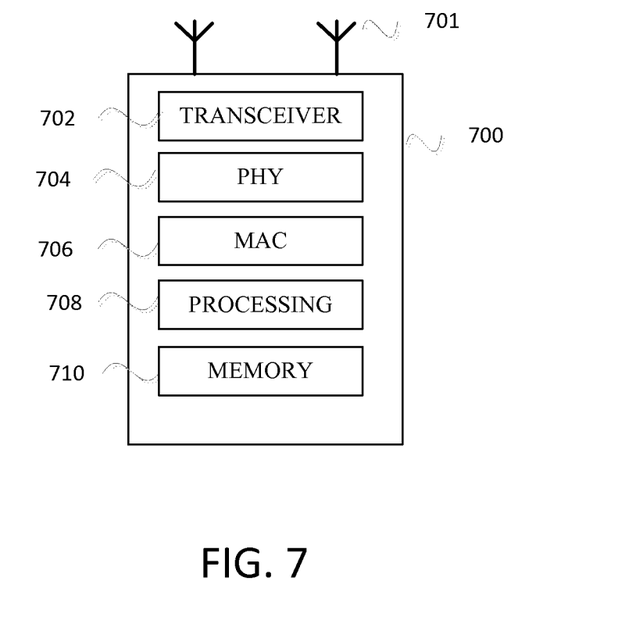
FIG. 7 illustrates a HEW device in accordance with some embodiments.

FIG. 7 illustrates a HEW device in accordance with some embodiments. HEW device 700 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 700 may be suitable for operating as master station 102 (FIG. 1) or a HEW STA 104 (FIG. 1). In accordance with embodiments, HEW device 700 may include, among other things, a transmit/receive element 701 (for example an antenna), a transceiver 702, physical (PHY) circuitry 704, and media access control (MAC) circuitry 706. PHY circuitry 704 and MAC circuitry 706 may be HEW compliant layers and may also be compliant with one or more legacy IEEE 802.11 standards. MAC circuitry 706 may be arranged to configure packets such as a physical layer convergence procedure (PLCP) protocol data unit (PPDUs) and arranged to transmit and receive PPDUs, among other things. HEW device 700 may also include circuitry 708 and memory 710 configured to perform the various operations described herein. The circuitry 708 may be coupled to the transceiver 702, which may be coupled to the transmit/receive element 701. While FIG. 7 depicts the circuitry 708 and the transceiver 702 as separate components, the circuitry 708 and the transceiver 702 may be integrated together in an electronic package or chip.

In some embodiments, the MAC circuitry 706 may be arranged to contend for a wireless medium during a contention period to receive control of the medium for the HEW control period and configure an HEW PPDU. In some embodiments, the MAC circuitry 706 may be arranged to contend for the wireless medium based on channel contention settings, a transmitting power level, and a CCA level.

The PHY circuitry 704 may be arranged to transmit the HEW PPDU. The PHY circuitry 704 may include circuitry for modulation/demodulation, upconversion/downconversion, filtering, amplification, etc. In some embodiments, the circuitry 708 may include one or more processors. The circuitry 708 may be configured to perform functions based on instructions being stored in a RAM or ROM, or based on special purpose circuitry. The circuitry 708 may be termed processing circuitry in accordance with some embodiments. The circuitry 708 may include a processor such as a general purpose processor or special purpose processor. The circuitry 708 may implement one or more functions associated with transmit/receive elements 701, the transceiver 702, the PHY circuitry 704, the MAC circuitry 706, and/or the memory 710.

In some embodiments, the circuitry 708 may be configured to perform one or more of the functions and/or methods described herein and/or in conjunction with FIGS. 1-7 such as transmitting and receiving HE-SIGs and using the received HE-SIG to determine an AGC for receiving a subsequent data field.

In some embodiments, the transmit/receive elements 701 may be two or more antennas that may be coupled to the PHY circuitry 704 and arranged for sending and receiving signals including transmission of the HEW packets. The transceiver 702 may transmit and receive data such as HEW PPDU and packets that include an indication that the HEW device 700 should adapt the channel contention settings according to settings included in the packet. The memory 710 may store information for configuring the other circuitry to perform operations for configuring and transmitting HEW packets and performing the various operations to perform one or more of the functions and/or methods described herein and/or in conjunction with FIGS. 1-7 such as transmitting and receiving HE-SIGs and using the received HE-SIG to determine an AGC for receiving a subsequent data field.

In some embodiments, the HEW device 700 may be configured to communicate using OFDM communication signals over a multicarrier communication channel. In some embodiments, HEW device 700 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 700 may use 4× symbol duration of 802.11n or 802.11 ac.

In some embodiments, an HEW device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 701 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is an apparatus of an apparatus of a high-efficiency wireless local-area network (HEW) station. The HEW station including circuitry configured to: receive a trigger frame comprising an allocation of a resource block for the HEW station; and transmit a high efficiency short training field (HE-STF) with a same bandwidth as a subsequent data portion, where the HE-STF is to be transmitted in accordance with orthogonal frequency division multiple access (OFDMA) and where the bandwidth is indicated in the allocation and is less than 20 MHz.

In Example 2, the subject matter of Example 1 can optionally include where a subcarrier allocation for the HE-STF matches a subcarrier allocation for the subsequent data portion.

In Example 3, the subject matter of Examples 1 or 2 can optionally include where the HE-STF and the subsequent data portion are transmitted with a same power.

In Example 4, the subject matter of any of Examples 1-3 can optionally include where a total power of active subcarriers of the HE-STF are equal to or proportional to a second total of data subcarriers and pilot subcarriers of the subsequent data portion.

In Example 5, the subject matter of any of Examples 1-4 can optionally include wherein the bandwidth is one from the following group: 1.25 MHz, 2 MHz, 2.5 MHz, 5 MHz, and 10 MHz.

In Example 6, the subject matter of any of Examples 1-5 can optionally include where a subcarrier pattern of the HE-STF is the same as a subcarrier pattern of the data portion.

In Example 7, the subject matter of any of Examples 1-6 can optionally include where the HE-STF comprises at least two active subcarriers for the resource block.

In Example 8, the subject matter of any of Examples 1-7 can optionally include where the allocation comprises one or more additional resource blocks for the HEW station.

In Example 9, the subject matter of Example 8 can optionally include where the resource block and the one or more additional resource blocks have a same subcarrier pattern for the HE-STF.

In Example 10, the subject matter of Example 8 can optionally include where the circuitry is further configured to transmit a separate HE-STF within each of the one or more additional resource blocks.

In Example 11, the subject matter of Example 8 can optionally include where the HE-STF and the allocation and the one or more additional allocations have a same bandwidth.

In Example 12, the subject matter of any of Examples 1-11 can optionally include where the HE-STF comprises one or more subcarriers, and where the one or more subcarriers are transmitted at a higher power to compensate for one or more muted subcarriers, where the one or more muted subcarriers are muted for one of the reasons from the following group: an out-of-band emission, peak to average power ratio (PAPR) reduction, and DC.

In Example 13, the subject matter of any of Examples 1-12 can optionally include where the HE-STF comprises a plurality of evenly spaced subcarriers.

In Example 14, the subject matter of any of Examples 1-13 can optionally include where the HE-STF comprises at least one subcarrier transmitted with a greater power than other subcarriers to compensate for a lower number of subcarriers in a portion of the resource block.

In Example 15, the subject matter of any of Examples 1-14 can optionally include where the circuitry is further configured to: receive a second allocation of a second resource block, wherein the second allocation is for a downlink transmission from a master station; and receive a second HE-STF with a second same bandwidth as a bandwidth of a total allocation of a plurality of HEW stations, wherein the HEW station is one of the plurality of HEW stations and wherein each subchannel of the total allocation has a same or proportional power.

In Example 16, the subject matter of Example 15 can optionally include where the circuitry is further configured to determine an automatic gain control (AGC) from the second HE-STF, and wherein the AGC is for a subsequent data portion.

In Example 17, the subject matter of any of Examples 1-16 can optionally include where a pattern of subcarriers is repeated for at least two of a plurality of sub-channels of the resource block.

In Example 18, the subject matter of Example 17 can optionally include where a spacing between subcarriers of the at least two of the plurality of subchannels is a same frequency.

In Example 19, the subject matter of any of Examples 1-18 can optionally include where active subcarriers of the HE-STF are one-quarter down sampled in comparison to the subsequent data portion, and where at least one of the active subcarriers is power compensated due to a fewer number of active subcarriers within a subchannel of the resource allocation.

In Example 20, the subject matter of any of Examples 1-19 can optionally include memory coupled to the circuitry; and, one or more antennas coupled to the circuitry.

In Example 21, the subject matter of any of Examples 1-20 can optionally include where the circuitry further comprises processing circuitry and transceiver circuitry.

Example 22 is a method performed on a wireless local-area network (HEW) station. The method including receiving a trigger frame comprising an allocation of a resource block for the HEW station; and transmitting a high efficiency short training field (HE-STF) with a same bandwidth as a subsequent data portion, wherein the HE-STF is to be transmitted in accordance with orthogonal frequency division multiple access (OFDMA).

In Example 23, the subject matter of Example 22 can optionally include where a subcarrier allocation for the HE-STF matches a subcarrier allocation for the subsequent data portion.

Example 24 is a non-transitory computer-readable storage medium that stores instructions for execution by one or more processors on a wireless communication device. The operations configure the wireless communication device to: receive a trigger frame comprising an allocation of a resource block for the HEW station; and transmit a high efficiency short training field (HE-STF) with a same bandwidth as a subsequent data portion, wherein the HE-STF is to be transmitted in accordance with orthogonal frequency division multiple access (OFDMA).

In Example 25, the subject matter of Example 24 can optionally include where the HE-STF and the subsequent data portion are transmitted with a same power.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station, the apparatus comprising: memory; and, circuitry coupled to the memory, wherein the circuitry is configured to:
   decode a trigger frame comprising a first allocation of a first resource block and a second allocation, wherein the first resource block is one of a plurality of first resource blocks and is for a downlink transmission from a HE access point to the HE station, and wherein the second allocation is for an uplink transmission from the HE station to the HE access point;
   decode a first HE short training field (HE-STF) with a same bandwidth as a total bandwidth of the plurality of first resource blocks for a plurality of HE stations, wherein the HE station is one of the plurality of HE stations; and
   configure the HE station to transmit a frame comprising a second HE-STF with a same bandwidth as a subsequent data portion, wherein the second HE-STF is to be transmitted in accordance with orthogonal frequency division multiple access (OFDMA) and wherein the bandwidth of the subsequent data portion is indicated in the second allocation and is less than 20 MHz.

2. The apparatus of the HE station of claim 1, wherein a subcarrier allocation for the second HE-STF matches a subcarrier allocation for the subsequent data portion.

3. The apparatus of the HE station of claim 1, wherein the second HE-STF and the subsequent data portion are transmitted with a same power.

4. The apparatus of the HE station of claim 1, wherein a total power of active subcarriers of the second HE-STF are equal to or proportional to a second total of data subcarriers and pilot subcarriers of the subsequent data portion.

5. The apparatus of the HE station of claim 1, wherein the bandwidth is one from the following group: 1.25 MHz, 2 MHz, 2.5 MHz, 5 MHz, and 10 MHz.

6. The apparatus of the HE station of claim 1, wherein a subcarrier pattern of the second HE-STF is the same as a subcarrier pattern of the data portion.

7. The apparatus of the HE station of claim 1, wherein the second HE-STF comprises at least two active subcarriers for the resource block.

8. The apparatus of the HE station of claim 1, wherein the second resource allocation comprises a second resource block for the HE station.

9. The apparatus of the HE station of claim 8, wherein the second resource block has a same subcarrier pattern as the HE-STF.

10. The apparatus of the HE station of claim 8, wherein the second resource allocation comprises one or more additional resource blocks, and wherein the circuitry is further configured to transmit a separate HE-STF within each of the one or more additional resource blocks.

11. The apparatus of the HE station of claim 10, wherein the second HE-STF and the second resource block and the one or more additional resource blocks have a same bandwidth.

12. The apparatus of the HE station of claim 1, wherein the second HE-STF comprises one or more subcarriers, and where the one or more subcarriers are transmitted at a higher power to compensate for one or more muted subcarriers, wherein the one or more muted subcarriers are muted for one of the reasons from the following group: an out-of-band emission, peak to average power ratio (PAPR) reduction, and DC.

13. The apparatus of the HE station of claim 1, wherein the second HE-STF comprises a plurality of evenly spaced subcarriers.

14. The apparatus of the HE station of claim 1, wherein the second HE-STF comprises at least one subcarrier transmitted with a greater power than other subcarriers to compensate for a lower number of subcarriers in a portion of the second resource block.

15. The apparatus of the HE station of claim 1, wherein the circuitry is further configured to determine an automatic gain control (AGC) from the first HE-STF, and wherein the AGC is for a subsequent data portion.

16. The apparatus of the HE station of claim 1, wherein a pattern of subcarriers is repeated for at least two of a plurality of first resource blocks of the plurality of first resource blocks.

17. The apparatus of the HE station of claim 16, wherein a spacing between subcarriers of the at least two of the plurality of first resource blocks is a same frequency.

18. The apparatus of the HE station of claim 1, wherein active subcarriers of the second HE-STF are one-quarter down sampled in comparison to the subsequent data portion, and wherein at least one of the active subcarriers is power compensated due to a fewer number of active subcarriers within a subchannel of the second resource allocation.

19. The apparatus of the HE station of claim 1, further comprising transceiver circuitry coupled to the circuitry; and, one or more antennas coupled to the transceiver circuitry.

20. The apparatus of the HE station of claim 1, wherein the circuitry further comprises processing circuitry and transceiver circuitry.

21. A method performed on a high efficiency (HE) station, the method comprising:

decoding a trigger frame comprising a first allocation of a first resource block and a second allocation, wherein the first resource block is one of a plurality of first resource blocks and is for a downlink transmission from a HE access point to the HE station, and wherein the second allocation is for an uplink transmission from the HE station to the HE access point;

decoding a first HE short training field (HE-STF) with a same bandwidth as a total bandwidth of the plurality of first resource blocks for a plurality of HE stations, wherein the HE station is one of the plurality of HE stations; and configuring the HE station to transmit a frame comprising a second HE-STF with a same bandwidth as a subsequent data portion, wherein the second HE-STF is to be transmitted in accordance with orthogonal frequency division multiple access (OFDMA) and wherein the bandwidth of the subsequent data portion is indicated in the second allocation and is less than 20 MHz.

22. The method of claim 21, wherein a subcarrier allocation for the second HE-STF matches a subcarrier allocation for the subsequent data portion.

23. A non-transitory computer-readable storage medium that stores instructions for execution by one or more processors on a wireless communication device, the operations to configure a high-efficiency (HE) station to:

decode a trigger frame comprising a first allocation of a first resource block and a second allocation, wherein the first resource block is one of a plurality of first resource blocks and is for a downlink transmission from a HE access point to the HE station, and wherein the second allocation is for an uplink transmission from the HE station to the HE access point;

decode a first HE short training field (HE-STF) with a same bandwidth as a total bandwidth of the plurality of first resource blocks for a plurality of HE stations, wherein the HE station is one of the plurality of HE stations; and configure the HE station to transmit a frame comprising a second HE-STF with a same bandwidth as a subsequent data portion, wherein the second HE-STF is to be transmitted in accordance with orthogonal frequency division multiple access (OFDMA) and wherein the bandwidth of the subsequent data portion is indicated in the second allocation and is less than 20 MHz.

24. The non-transitory computer-readable storage medium of claim 23, wherein the second HE-STF and the subsequent data portion are transmitted with a same power.

* * * * *